(Model.)

H. B. CHESS.
TACK MACHINE.

No. 299,346. 6 Sheets—Sheet 1.

Patented May 27, 1884.

Witnesses:
J. Walter Fowler.
H. B. Applewhaite.

Inventor
Harvey B. Chess
by his attys
A. H. Evans & Co (Model.)
6 Sheets—Sheet 2.
H. B. CHESS.
TACK MACHINE.
No. 299,346.  Patented May 27, 1884.
Fig. 2.
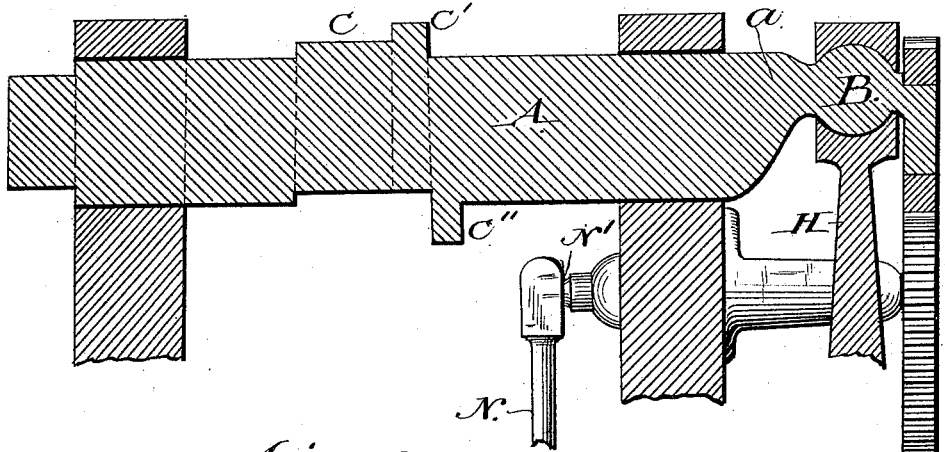
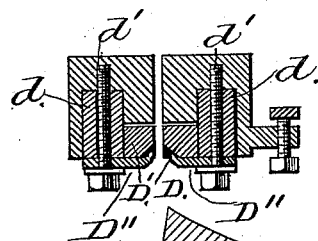
Fig. 3.
Fig. 4.
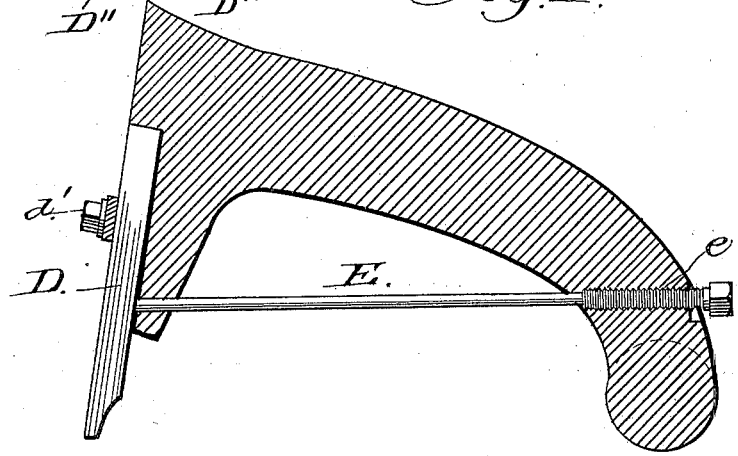
Attest;
J. Walter Fowler
H. B. Applewhait
Inventor,
Harvey B Chess
by his atty.
A. H. Evans & Co (Model.) 6 Sheets—Sheet 3.

H. B. CHESS.
TACK MACHINE.

No. 299,346. Patented May 27, 1884.

Attest;
S. Walter Fowler
H. B. Applewhait

Inventor;
Harvey B. Chess
by his attys
A. H. Evans & Co (Model.)
6 Sheets—Sheet 4.
H. B. CHESS.
TACK MACHINE.
No. 299,346.
Patented May 27, 1884.
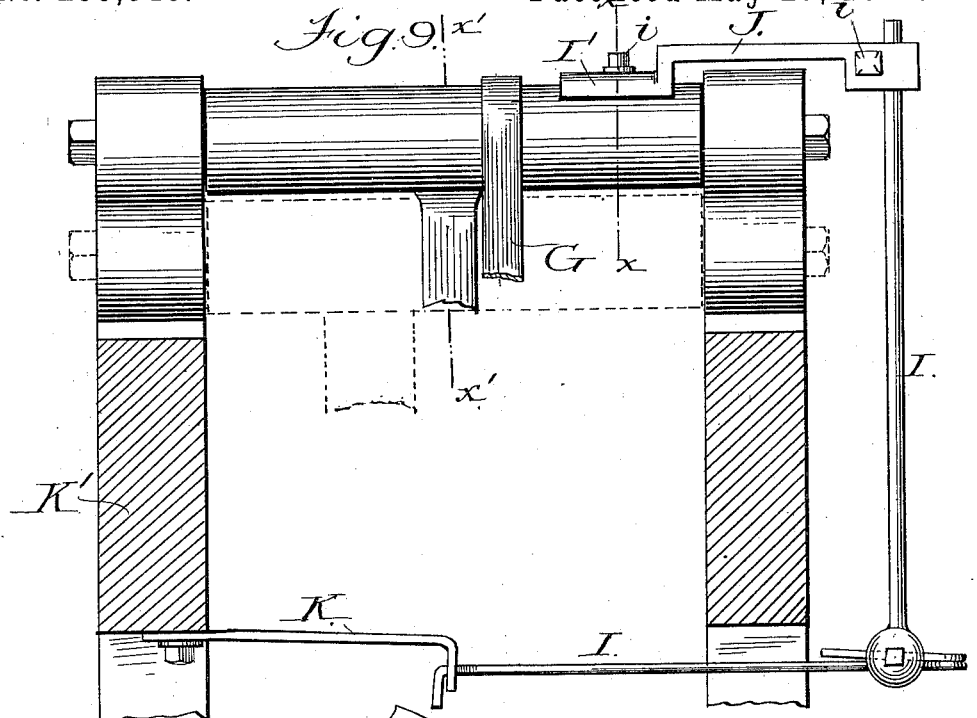
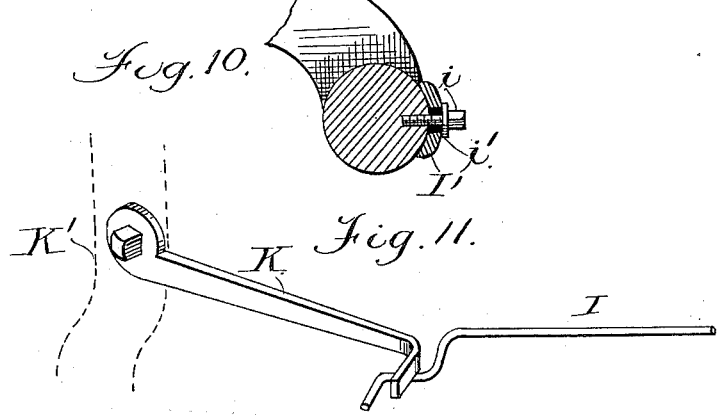
Attest;
S. Walter Fowler
H. B. Applewhaite
Inventor;
Harvey B. Chess
by his attys
A. H. Evans & Co.
N. PETERS, Photo-Lithographer, Washington, D. C.

(Model.) 6 Sheets—Sheet 5.
H. B. CHESS.
TACK MACHINE.
No. 299,346. Patented May 27, 1884.
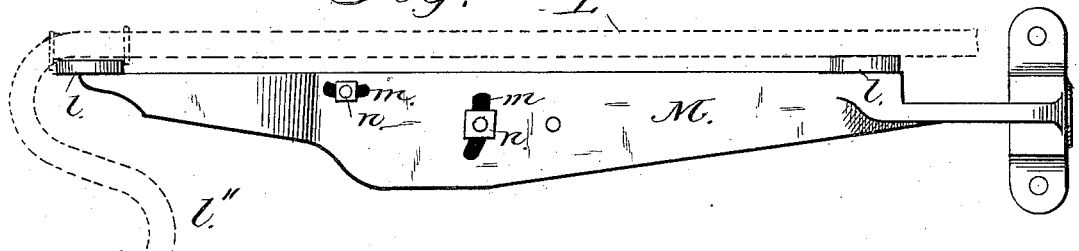
Fig. 12.
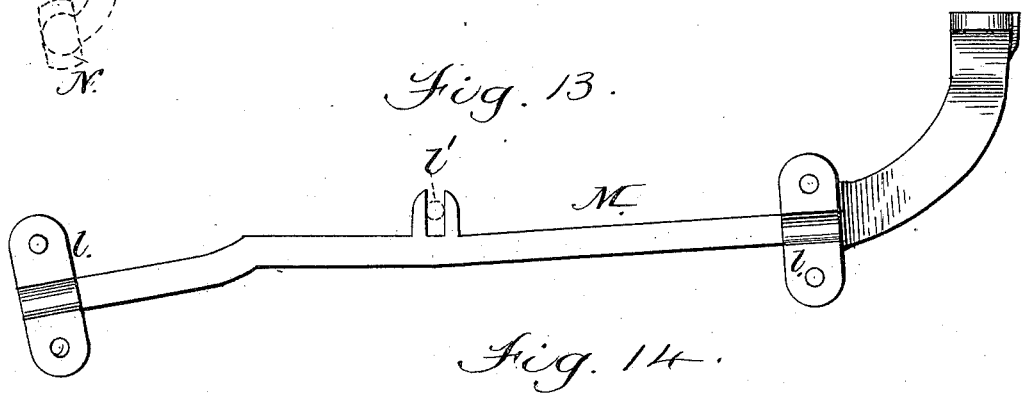
Fig. 13.
Fig. 15.
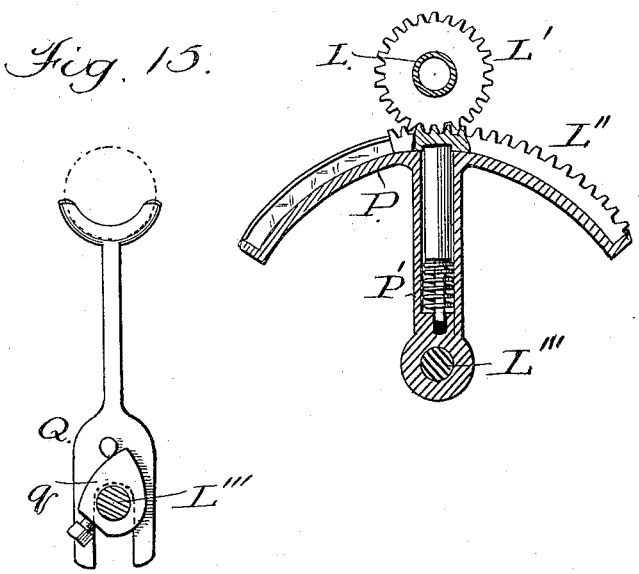
Fig. 14.
Attest:
T. Walter Fowler,
H. B. Applewhaite,
Inventor;
Harvey B. Chess
by his Attys
A. H. Evans & Co.

(Model.)

6 Sheets—Sheet 6.

H. B. CHESS.
TACK MACHINE.

No. 299,346. Patented May 27, 1884.

Attest:
T. Walter Fowler
H. B. Applewhaite

Inventor:
Harvey B. Chess
by his Att'ys
A. H. Evans &c.

UNITED STATES PATENT OFFICE.

HARVEY B. CHESS, OF PITTSBURG, PENNSYLVANIA.

TACK-MACHINE.

SPECIFICATION forming part of Letters Patent No. 299,346, dated May 27, 1884.

Application filed November 8, 1883. (Model.)

*To all whom it may concern:*

Be it known that I, HARVEY B. CHESS, of Pittsburg, in the county of Allegheny and State of Pennsylvania, have invented a new and useful Improvement in Tack-Machines, of which the following is a full, clear, and exact description, reference being had to the accompanying drawings, making a part of this specification, in which—

Figure 1:
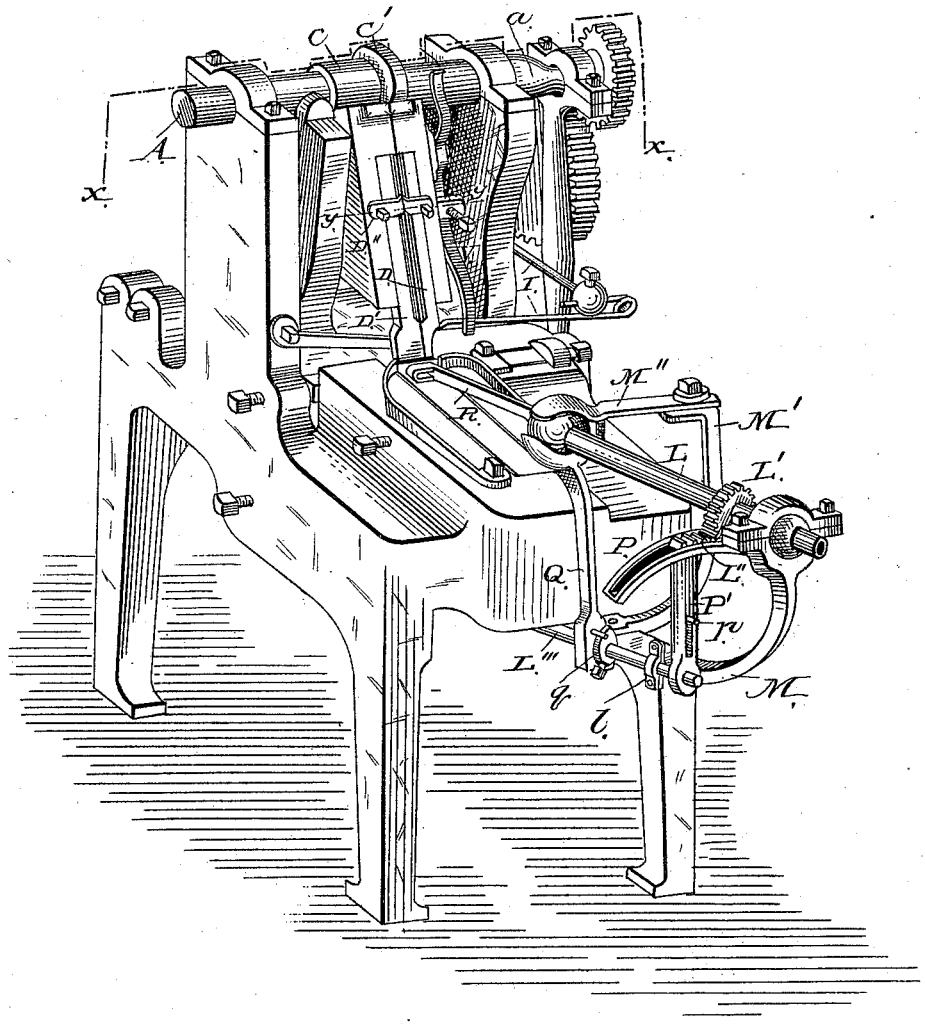
Figure 5:
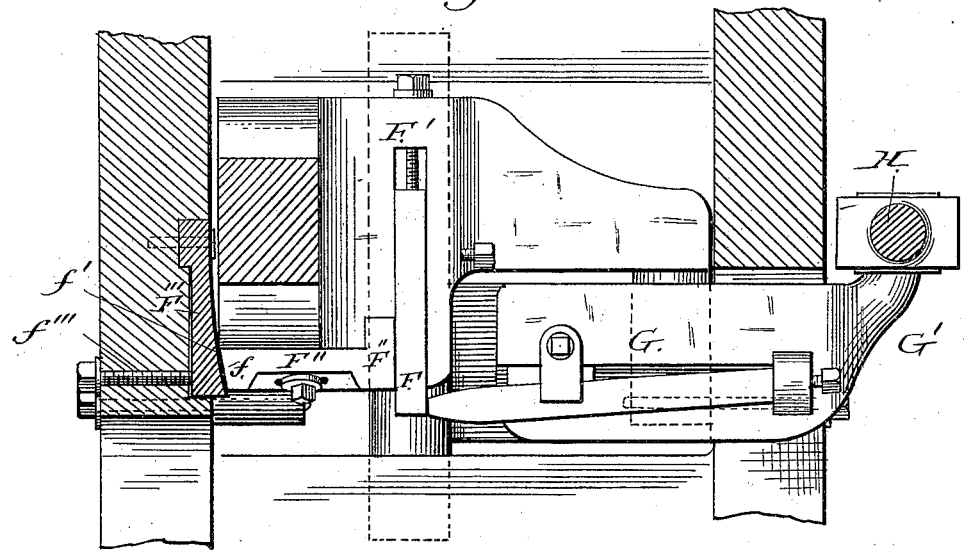
Figure 6:
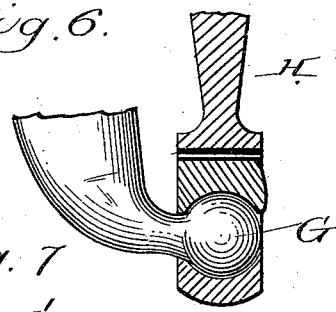
Figure 7:
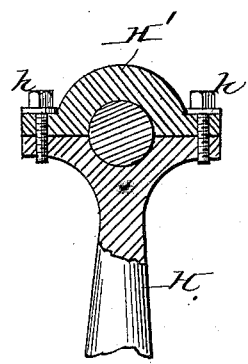
Figure 8:
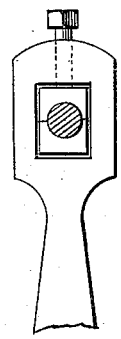
Figure 16:
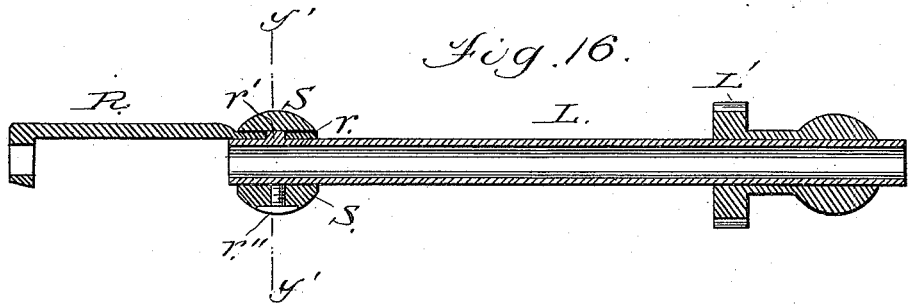
Figure 17:
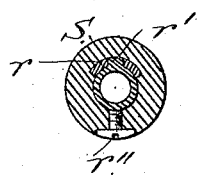
Figure 18:
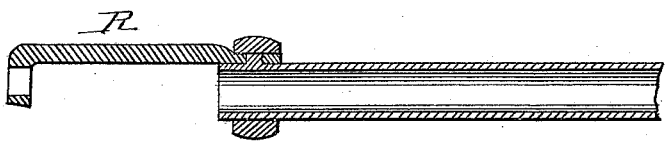

Figure 1 is a perspective view of a tack-machine with my improvements attached. Fig. 2 is a vertical section through $xx$ of Fig. 1. Fig. 3 is a horizontal section through $yy$ of Fig. 1. Fig. 4 is a horizontal section through $x'x'$ of Fig. 9. Fig. 5 shows the "header-lever" journaled. Fig. 6 shows a section through the outer end of header-lever and of the lower end of the pitman. Fig. 7 shows the form of the upper end of the pitman. Fig. 8 shows the old form. Fig. 9 represents a plan view showing the manner of attaching the bearer to the machine. Fig. 10 is a section through the clamp to the leader-jaw. Fig. 11 shows the relative position of the stop and bearer. Fig. 12 is a plan view of the "rest" detached. Fig. 13 is a side elevation of the same. Fig. 14 is a vertical section through the arc and pinion. Fig. 15 is a view of the "lifting" device. Fig. 16 is a longitudinal section through the barrel and nose-piece. Fig. 17 is a transverse section through $y'y'$ of Fig. 16. Fig. 18 is a modification of the device for securing nose-piece.

My invention relates more particularly to that class of tack-machines known as the "Blanchard," although some portions of it may be applied to other forms of tack and nail machines; and it consists in the several combinations of devices hereinafter explained and claimed.

To enable others skilled in the art to make and use my invention, I will proceed to describe the exact manner in which I have carried it out.

The shaft A, instead of being made with the usual boss-head or crank-wheel carrying a wrist-pin, has a simple prolongation, $a$, of the shaft carried out into a wrist-pin, B, which I make spherical, (for a purpose hereinafter explained,) thus dispensing with the labor of making and fitting the usual wrist and set-screw, and at the same time avoiding the tendency of the wrist to loosen.

The cutter-cams C C' on the shaft A, I devide unequally, to give the one actuating the "logy" or larger cutter the larger surface. The "haul-off" cam C", I cast solid in place on the shaft, and thus dispense with the fitting and expense of attaching a separate piece.

I hold the cutting-tools, the "leader" D, and logy D' in place by the usual side and top set-screws, (not shown,) and by clamps D", provided with the cylindrical parts $d$, fitting into the jaw, as shown in Fig. 3. The ends of these clamps or "dogs" are bent down to fit the chamfer or bevel of the knives. By loosening the screws $d'$, passing longitudinally through the cylindrical portion of the dogs, they may be turned back, so as to permit an easy removal of the cutters without disturbing other adjusting-screws, and also permit the removal of a wide logy without disturbing the bed or stationary knife.

The rear adjusting-screws, E, have heretofore been threaded on their forward ends where they enter and pass through the cutter-jaw; but when thus formed they add no strength to the jaw, but have the opposite tendency. By my construction of these adjusting-screws I secure a brace for the jaws and hold the knives up to their work. This I accomplish by threading the screws E at a point, $e$, in the base of the arch, as shown in Fig. 4.

The thrust-strain of the heading action upon the moving die F and gripping-lever F' is taken up on an L-shaped piece of metal, F", preferably steel, so fitted and held that it sustains the die of itself, but so formed that when the gripping-lever is in position for gripping, the beveled end $f$ of the L-shaped piece will have moved up into close contact with the reversed-wedge-like plate $f'$, inserted in the bed of the machine, and which latter being "set up" by a set-screw, $f'''$, to impinge when the lever is up to the point of gripping, and in a stationary condition for the heading, the thrust is taken fairly by the bed, and as solidly as the bed-die, which receives its share of the thrust. Any lateral adjustment of the gripping-lever on its centers is easily compensated for. The thrust on this lever I do not take merely by a set-screw projecting through the side of the bed, and bearing directly on the inserted block of steel F''; but I insert an intermediate plate, F''', with an inclined face to correspond with wedge-shaped face f' of the plate or block F'', thus making the movement of the lever easy, but holding it firmly and solidly, as well as the die when "up."

Instead of centering the heading-lever G, I hold and swing it by forming its parts within the machine into two journals, which are held front and rear by two pocket-like bearings, so placed in position that the backward strain of heading is received by the solid bed of the machine. The outer end, G', of this lever, instead of receiving a wrist, is formed spherical or semi-spherical, with the spherical part downward, to take draft of the pitman H, thus securing an easy and proper bearing for the double motion of the pitman.

The pitman I form as shown in Figs. 2 and 7, and not, as is usual in this class of machinery, with a solid loop at the upper end. I provide a breaking device which, when excessive strain is felt by heading-lever, or when some obstruction gets into the machine, will yield before any damage can result to the pitman or other parts of the machine. This breaking device consists of the cap H' and small cap-screws h h. These screws constitute the weakest part of the machine, and will be the first to give way, which inflicts but a trifling loss, compared with the breaking of the pitman or other parts of the machine. At its lower end the pitman is formed into a loop of semi-spherical form, to receive and have easy movement around the semi-spherical end G' of the heading-lever, as shown in Fig. 6. The "bearer" I, I hold by a clamping device, I', attached to the rear of the leader-jaw, and this clamp has an easy adjustability on the jaw by means of the cap-screw i, fitting in the slot i', whereby the stem J at its front may be either elevated or depressed. It is also evident that by loosening the screw i the stem J may be moved forward or backward, or be rotated in the clamp. The bearer I may also be moved in or out relative to the working portion of the machine by simply loosening the screw i''' on the forward end of the stem J. The bearer I, thus mounted, necessarily partakes of the movement of the leader-jaw of the machine, and therefore the more certainly holds the blank while being carried down. This peculiar method of mounting the bearer gives an easy and delicate adjustment of an important part of the machine, and the whole is well out of the way of the operator while adjusting and setting his machine. The stop K, which prevents the bearer from rising above the edge of the bed-knife, I construct to work at or as nearly at the working end of the bearer as possible, and is supported by the upright K' on the left-hand side of the machine. By this construction the stop is kept well out of the way of the operator.

The feeder is of that kind which has a back-and-forth movement. A pinion, L', on the feeder-barrel L is actuated by an arc-rack, L'', carried on and actuated by a rock-shaft, L''', having bearings l l at both the front and rear attached to the barrel-rest M. This rest is so attached underneath the bed that when it is desired to readjust the line of the barrel by a horizontal movement or vibration of its outer extremity, and with it that of the line of feeding in the iron, for the purpose of widening or narrowing the blanks at the head part, the barrel moves in the arc of a circle the center of which is at or approximately near the guard of the machine and at the cutting-point. This movement of the rest is effected by a peculiar arrangement of slots m and screws n, as shown in Fig. 12, by which the rest is secured to the bed.

The arm M', (see Fig. 1,) which supports the bearing-down barrel-spring M'', is attached to the rest instead of the bed of the machine, as is usual in such machines, and consequently the arm partakes of this adjusting horizontal movement, thus holding its own relative position to the barrel, and avoiding any necessity of readjusting the barrel-spring M'', whatever may be the lateral adjustment of the barrel. The same is also true at any vertical readjustment of the barrel—the relative position of the barrel-spring M'' does not change, and no readjustment of this spring is needed.

The crank or lever l'' on the end of the rock-shaft L''', which receives the pitman N, (see Fig. 12,) descending from counter-shaft N', (see Fig. 2,) is formed into a ball-joint, permitting of the self-adjusting of the line of barrel L without interfering with the action or "time" of feeder relative to cutting, and without any separate adjustment at or near the bearing. All the parts connected with the shaft L''' and the rest M move together, without disturbing their relative position or their adjustment.

To insure perfect action of the arc-rack L'' and pinion L', and also to arrest the semi-rotation or reverse movement of the barrel L, I make the arc in two parts—viz., the arc-rack L'' and the arc proper, P. These are so fitted together that the arc-rack readily remains stationary when the spring-latch in the arm P' is withdrawn by depressing the knob p, located on the arm near the shaft, where there is but little motion, thus instantly stopping the action of the barrel L. By removing pressure from the knob p, the rack again engages with the arc P. It will be observed that the barrel L is left stationary with the nose-piece in a flat or proper position for the insertion of a fresh plate.

Beneath the forward end of the barrel I construct a lifting device, Q, which is actuated by a cam, q, on the rock-shaft L''', the purpose of which is to take the pressure and friction off the nose-piece R, and thus prevent the wear of this, as well as the bed-knife. This lifting device will be readily understood without a further description of the same.

The shank r of the nose-piece R is made of socket form, and incloses about one-third to one-half of the circumference of the barrel L. The shank is held in place by a permanent stud, r', on the surface of the barrel, which stud fits into a hole in the shank, as shown in Figs. 16, 17, and 18. This stud prevents end movement or rotation of the shank on the barrel, while the ball-ferrule S, provided with a recess for the shank, is slipped over the shank and holds it securely in position. The screw r'' fastens both ball and nose-piece firmly in their respective places, and the nose-piece, by this construction, is held always in one position in relation to the barrel. This construction also permits a quick and ready change of nose-piece, and provides for the center slot being always concentric with the bore of the barrel—an important feature in my invention. The shank of the nose-piece may be made tapering, so as the more readily to receive binding ball or ring, but always centering the slot in the point of the nose-piece. It is evident that two nose-pieces might be fastened to the barrel by the means described, and each held securely in position.

The haul-off spring-lever V, (see Fig. 1,) pivoted to the side of the leader-jaw, bears at its lower end against the bearer, and when the haul-off cam on the shaft A comes in contact with the upper portion of the haul-off spring-lever V, the lower portion is necessarily forced back, and in moving back hauls off the bearer to allow the blanks to fall, as shown in Fig. 1.

Having thus described my invention, what I claim as new, and desire to secure by Letters Patent, is—

1. In a tack and nail machine, the shaft A, having a prolongation, a, and spherical wrist-pin B, in combination with the pitman H and heading-lever G, substantially as and for the purpose set forth.

2. In a tack-machine, the shaft A, having an extension, a, and spherical wrist-pin B, and provided with cutter-cams C C', of unequal width, and a haul-off cam, C'', cast solid with the said shaft, in combination with the cutter-jaws, the leader D, and logy D', and the spring-lever V, all constructed to operate substantially as and for the purpose herein set forth.

3. The rear adjusting-screws, E, threaded at the point e in the base of the arch, in combination with the cutter-jaws and cutters, substantially as and for the purpose set forth.

4. The moving die F and gripping-lever F', in combination with the L-shaped piece F'' and reversed wedge-like plate F''' and set-screw f'''', all constructed to operate substantially as and for the purpose set forth.

5. The bearer I and the herein-described means for moving the bearer in or out, in combination with the stop K and haul-off spring-lever V, substantially as and for the purpose set forth.

6. The bearer I and stem J, in combination with the adjustable clamp I' and leader-jaw, all constructed to operate substantially as and for the purpose set forth.

7. The feeder-barrel L, provided with the pinion L' and the rock-shaft L''', in combination with the arc-rack L'', the arc P, the arm P', and spring-latch p, all constructed to operate substantially as and for the purpose set forth.

8. The rock-shaft L''', having bearings l l, attached to the rest M, the arm P', provided with the spring-latch p, the arc-rack L'', pinion L', and the arc P, in combination with the feeder-barrel L and barrel-rest M, all constructed to operate substantially as and for the purpose set forth.

9. The barrel-rest M, provided with the slots m and screws n, and adjusting-screw l', in combination with the feeder-barrel L, provided with the pinion L', the rock-shaft L''', carrying the arm P', the arc P, and arc-rack L'', the arm M', and the barrel-spring M'', all constructed to operate substantially as and for the purpose set forth.

10. The rock-shaft L''', provided with the crank or lever l'' on its end, and provided with a spherical wrist, in combination with the pitman N and counter-shaft N', substantially as and for the purpose described.

11. The rock-shaft L''', provided with the cam q, arm P', arc P, and arc-rack L'', in combination with the lifting device Q and feeder-barrel L, provided with the pinion L', substantially as and for the purpose described.

12. The nose-piece R, provided with the perforated shank r, in combination with the feeder-barrel L, provided with the stud r', and ball-ferrule S, provided with a recess to receive the shank and the screw r'', substantially as herein described, and for the purpose set forth.

HARVEY B. CHESS.

Witnesses:
WILLIAM N. EASTON,
THOMAS J. ROGERS.